United States Patent [19]

Takahashi et al.

[11] Patent Number: 5,785,433
[45] Date of Patent: Jul. 28, 1998

[54] ROLLING BEARING CREEP PREVENTION DEVICE

[75] Inventors: Masahiro Takahashi; Koichi Goto, both of Kanagawa, Japan

[73] Assignee: NSK Ltd., Tokyo, Japan

[21] Appl. No.: 895,892

[22] Filed: Jul. 7, 1997

[30] Foreign Application Priority Data

Jul. 17, 1996 [JP] Japan .................................. 8-187768
Jun. 25, 1997 [JP] Japan .................................. 9-169066

[51] Int. Cl.⁶ ........................................... F16C 19/00
[52] U.S. Cl. ........................... 384/539; 384/255; 384/537; 384/903
[58] Field of Search .......................... 384/539, 537, 384/903, 255, 585

[56] References Cited

U.S. PATENT DOCUMENTS 4,511,191  4/1985  Kitamura .
4,545,627  10/1985  Nakamura et al. .

FOREIGN PATENT DOCUMENTS 58-108626   7/1983   Japan ............... F16C 35/077
63-173519  11/1988   Japan ............... F16C 35/077
 7-19253    1/1995   Japan ............... F16C 35/077
 7-6521     1/1995   Japan ............... F16C 33/06
 1334869   10/1973   United Kingdom .
 2254330   10/1992   United Kingdom .

*Primary Examiner*—Lenard A. Footland
*Attorney, Agent, or Firm*—Sughrue, Mion, Zinn, Macpeak & Seas, PLLC

[57] ABSTRACT

An eccentric groove 10 is formed in an outer peripheral surface of an outer ring 5 and an outer peripheral surface of an eccentric ring 1a shaped like a segmentary ring is engaged with an inner peripheral surface of a housing 3 by friction. An elastic deformation part having a predetermined length dimension in the circumferential direction is formed in a part of the eccentric ring 1a. The elastic deformation part projects between a bottom face 11 of the eccentric groove 10 and the inner peripheral surface of the housing 3 in the mounting state in the housing 3. Resultantly, the rotation prevention effect of the outer ring 5 with respect to the housing 3 is improved.

11 Claims, 7 Drawing Sheets

ROLLING BEARING CREEP PREVENTION DEVICE

BACKGROUND OF THE INVENTION

The present invention relates to a rolling bearing creep prevention device, and particularly to a rolling bearing creep prevention device which is used to prevent the outer ring of a rolling bearing built in a rotation support section of each auxiliary machine for an automobile, such as an alternator or car air-conditioner compressor, from rotating in a housing.

Various auxiliary machines for an automobile often have a housing made of an aluminum alloy within which a rolling bearing for supporting a rotation shaft built. In the case where the rolling bearing is built in the inside of the housing, the outer ring forming a part of the rolling bearing is stationary fixed to the inside of the housing by a fittingly inserting manner. However, the aluminum alloy forming the housing has a thermal expansion coefficient larger than bearing steel forming the outer ring of the rolling bearing. Thus, if no countermeasures are taken, when temperature rises, the interference of the outer ring relative to the housing is lowered (or is lost), so that a so-called creep where the outer ring rotates in the housing is occurred and a rattle is simultaneously occurred in the rotation support section because of the rolling bearing. Moreover, the inner peripheral surface of the housing wears with rotation of the outer ring, thus the rattle grows gradually.

To prevent rotation of the outer ring in the housing causing such a problem, hitherto, rolling bearing creep prevention devices, for example, as described in Japanese Utility Model Laid-Open Nos. Sho 58-108626, Sho 63-173519, and Hei 1-85527 have been known. Every rolling bearing creep prevention device described here has an eccentric groove formed in the outer peripheral surface of an outer ring in a state in which the center axis of the bottom face of the eccentric groove is made eccentric with respect to the center axis of the outer ring. An eccentric ring shaped like a segmental ring as a whole made of a synthetic resin having elasticity and having the center axis of the inner peripheral surface and the center axis of the outer peripheral surface made eccentric with each other is fitted into the inside of the eccentric groove. When a rolling bearing is fitted into the inside of a housing, the eccentric ring is fitted into the inner peripheral surface of the housing.

The synthetic resin forming the eccentric ring has a thermal expansion coefficient larger than an aluminum alloy forming the housing. Thus, if the interference of the outer ring relative to the housing lowers as temperature rises, the diametric thickness dimension of the eccentric ring grows, thereby compensating lowering of the interference. Since the bottom face of the eccentric groove and the inner peripheral surface of the eccentric ring are eccentric with respect to the outer peripheral surfaces of the outer ring and the eccentric ring, the eccentric ring does not rotate relative to the outer ring. Thus, even when temperature rises, rotation of the outer ring of the bearing made of steel in the housing made of an aluminum alloy is prevented.

With the conventional rolling bearing creep prevention device, slip prevention between the outer peripheral surface of the eccentric ring and the inner peripheral surface of the housing is intended only by a frictional force associated with pressing the eccentric ring into the housing. Thus, the dimensional accuracy of the component parts must be restricted strictly and if the outer diameter dimension of the outer ring relative to the inner diameter dimension of the housing is lessened due to a dimensional error, the effect of the slip prevention becomes insufficient. This is a problem.

SUMMARY OF THE PRESENT INVENTION

It is an object of the present invention to solve the conventional problem and to provide a rolling bearing creep prevention device in which the rotation prevention effect of an outer ring of the rolling bearing with respect to a housing accommodating the rolling bearing is improved.

The object can be attained by a rolling bearing creep prevention device, according to the present invention, for a rolling bearing built in a cylindrical inner peripheral surface of a housing and provided with an outer ring having an outer peripheral surface on-which an eccentric groove is formed in such a manner that the eccentric groove is recessed from the outer peripheral surface and that a center axis of a bottom face of the eccentric groove is made eccentric with respect to a center axis of the outer ring, comprising:

a C-shaped eccentric ring fitted to an inside of the eccentric groove and fittingly inserted to the inner peripheral surface of the housing, the center axes of an inner peripheral surface and an outer peripheral surface of the eccentric ring being made eccentric with each other, wherein an elastic deformation part projecting outward in a diameter direction of the eccentric ring is formed in a part of the eccentric ring.

With the rolling bearing creep prevention device of the invention as described above, when the elastic deformation part formed on the eccentric ring is mounted in the housing, it is crushed elastically between the inner peripheral surface of the housing and the bottom face of the eccentric groove, and abuts uniformly and elastically the inner peripheral surface of the housing over the full length thereof. Therefore, the slip prevention effect can be demonstrated regardless of a slight dimension error.

Further, in the above-mentioned construction according to the present invention, the elastic deformation part may be formed into an arc-shape which is concentric with the outer peripheral surface of the eccentric ring and has a predetermined length in a circumferential direction so as to uniformly abut the inner peripheral surface of the housing over the full length thereof.

With this construction of the rolling bearing creep prevention device, the elastic deformation part made on the eccentric ring forming a part of the rolling bearing creep prevention device of the invention has the arc abutment part in the intermediate part and the outer peripheral surface of the arc abutment part abuts the inner peripheral surface of the housing almost equally over the full length thereof. Thus, the contact area between the outer peripheral surface of each arc abutment part and the inner peripheral surface of the housing can be widened sufficiently. Therefore, if a condition is strict such that a dimension error grows, the sufficient effect of preventing the eccentric ring from slipping with respect to the housing can be provided.

Furthermore, in the above-mentioned construction according to the present invention, the elastic deformation part may be provided with a protrusion projecting diametrically outward at an intermediate part in the circumferential direction.

The above-mentioned construction of the rolling bearing creep prevention device can provide the slip prevention effect of the eccentric ring based on engagement between the protrusion formed in the intermediate part in the circumferential direction of the arc abutment part in a state in which the protrusion projects diametrically outward and the inner peripheral surface of housing. That is, if an axial groove such as a key groove or a spline groove exists in the inner peripheral surface of the housing, the eccentric ring can be reliably prevented from slipping, based on the engagement between the protrusion and the groove. If no groove exists, surface pressure of the abutment part between the tip face part of the protrusion and the inner peripheral surface of the housing rises, thereby raising the frictional force acting on the abutment part for preventing the eccentric ring from slipping. Further, based on the fact that the protrusion is formed in the intermediate part in the circumferential direction of the arc abutment part, the necessary slip prevention effect can also be produced even if the dimension and shape accuracy of the eccentric ring is somewhat poor.

DETAILED DESCRIPTION OF PREFERRED EMBODIMENTS

FIGS. 1 and 2(A)–(C) show a first embodiment of the present invention. A rolling bearing creep prevention device of the invention prevents an outer ring 5 of a rolling bearing 4 fittingly secured to the inside of a housing 3 made of an aluminum alloy and having a cylindrical inner peripheral surface from rotating (creeping) with respect to the housing 3. The rolling bearing 4 comprises an outer ring 5 having an outer race track 6 on an inner peripheral surface, an inner ring 8 having an inner race track 6 on an outer peripheral surface, and a plurality of rolling elements 9 and 9 located rotatably between the outer race track 6 and the inner race track 7. The outer ring 5 is formed on an outer peripheral surface with an eccentric groove 10 in a state in which the eccentric groove is recessed from the outer peripheral surface. The center axis of a bottom face 11 of the eccentric groove 10 is eccentric with respect to the center axis of the outer ring 5.

Figure 2A:
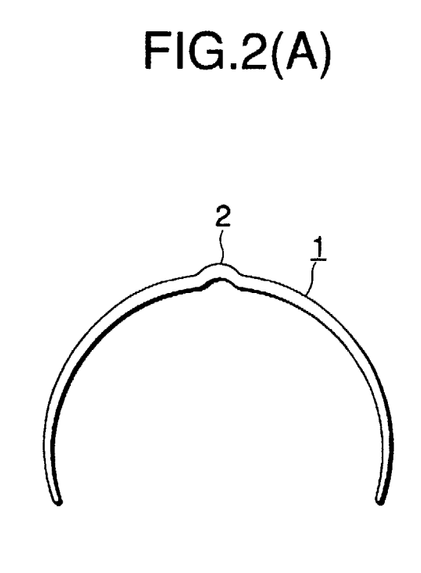
FIGS. 2(A)-2(C) are respectively an illustration of an eccentric ring used in a first embodiment of the invention when viewed from one side of FIG. 1.
Figure 2B:
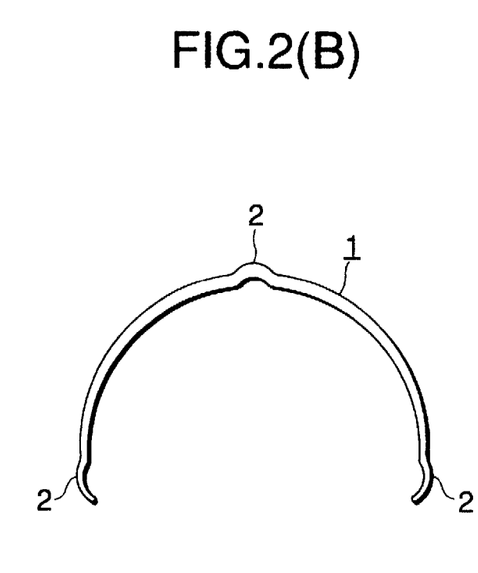
Figure 2C:
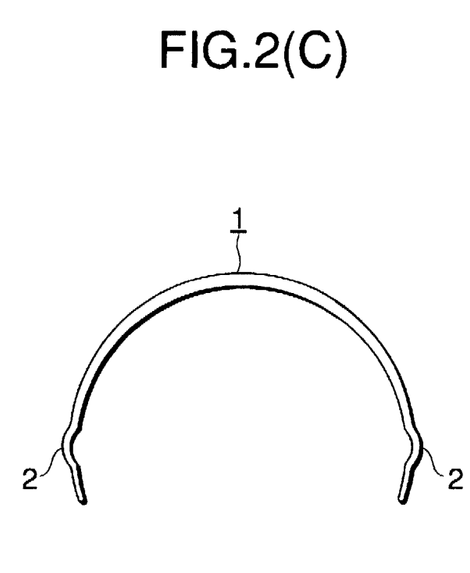

On the other hand, an eccentric ring 1 fitted into the eccentric groove 10 is made of a synthetic resin having elasticity and shaped like a segmental ring as a whole, for example, as shown in FIGS. 2(A)–(C). The eccentric ring 1 is formed at one or more points with arc elastic deformation part 2, 2 projecting outward in the diameter direction from the outer peripheral surface of the eccentric ring, for example, as shown in FIG. 2(A)–(C). When the eccentric ring 1 is mounted in a housing, the elastic deformation part 2, 2 is crushed elastically between the inner peripheral surface of the housing and the bottom face of an eccentric groove formed on the outer peripheral surface of an outer ring and abuts elastically the inner peripheral surface of the housing. Therefore, the slip prevention effect can be demonstrated regardless of a slight dimensional error.

Figure 3:
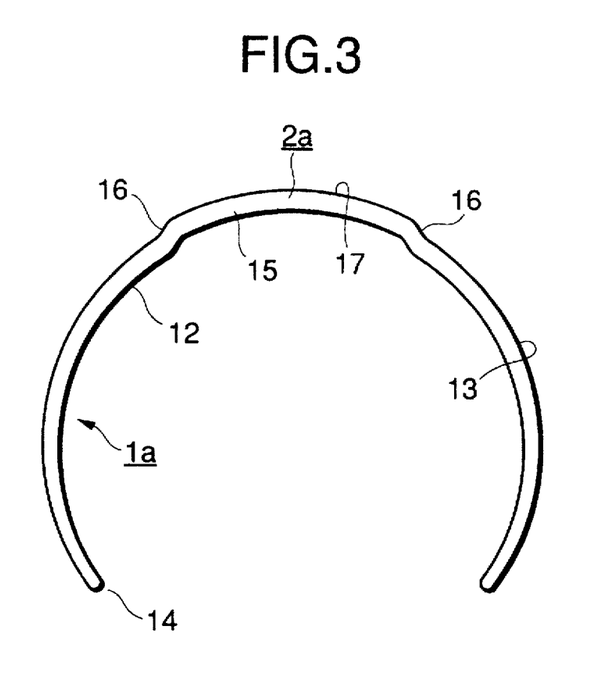
FIG. 3 is an illustration of an eccentric ring used in a second embodiment of the invention when viewed from one side of FIG. 1.

FIG. 3 shows a second embodiment of the rolling bearing creep prevention device according to the present invention. An eccentric ring 1a fitted into the eccentric groove 10 is made of a synthetic resin having elasticity and shaped like a segmental ring as a whole, for example, as shown in FIG. 3. The eccentric ring 1a has the center axis of an inner peripheral surface 12 and the center axis of an outer peripheral surface 13 made eccentric with each other. The direction in which the center axes of the inner and outer peripheral surfaces are made eccentric is the direction in which the center axis of the inner peripheral surface 12 is made eccentric to the side of a discontinuous part 14 of the eccentric ring 1a with respect to the center axis of the outer peripheral surface 13. Therefore, the thickness of the eccentric ring 1a in the diameter direction are the largest at the center and lessen gradually toward both ends.

A synthetic resin material forming the eccentric ring 1a is selected based on design consideration in response to application. For example, a polyphenylene sulfide resin (PPS) containing glass fiber 10%–40% by volume has heat-resistance temperature of 200° C. or more and is also excellent in mechanical strength, thus can be used preferably.

For such a PPS reinforced with glass fiber, if the content of the glass fiber is less than 10% by volume, the strength improvement effect produced by mixing the glass fiber is poor and the PPS is easily crushed. In contrast, if the content of the glass fiber-exceeds 40% by volume, elasticity lowers too much and the PPS is easily broken. Thus, PPS containing glass fiber 10%–40% by volume, preferably 20–30% by volume, is preferred from the aspects of providing strength and decreasing costs. As the material forming the eccentric ring 1a, a resin family material such as polyamide 11, polyamide 46, polyamide 66, polybutylene terephthalate (PBT), or modified polyphenylene oxide (PPO) or a rubber family material such as a PBT elastomer or a polyamide elastomer can also be used in addition to the PPS. Further, like the PPS, the materials can also be reinforced with the glass fiber 10%–40% by volume.

Further, an elastic deformation part 2a projecting outward in the diameter direction of the eccentric ring 1a is formed in a part of the eccentric ring 1a. An arc abutment part 15 is located in an intermediate part of the elastic deformation part 2a. An outer peripheral surface 17 of the arc abutment part 15 is like an arc concentric with the outer peripheral surface 13 of the eccentric ring 1a and is long in the circumferential direction. The elastic deformation part 2a comprises the arc abutment part 15 and the main part of the eccentric ring 1a made contiguous via bends 16 and 16 made at both ends in the circumferential direction of the arc abutment part 15. Therefore, with the eccentric ring 1a fitted into the housing 3, the outer peripheral surface 17 of the arc abutment part 15 abuts the inner peripheral surface of the housing 3 almost equally over the full length thereof.

To assemble the rolling bearing creep prevention device of the invention comprising the rolling bearing 4 and the eccentric ring 1a, first the eccentric ring 1a is fitted to the inside of the eccentric groove 10 in the outer peripheral surface of the outer ring 5 forming a part of the rolling bearing 4. At this time, the eccentric directions of the eccentric groove 10 and the eccentric ring 1a are matched with each other, and the positional relationship in the diameter direction between the portions except the elastic deformation part 2a on the outer peripheral surface 13 of the eccentric ring 1a and the outer peripheral surface of the outer ring 5 are made almost uniform over the whole of the perimeter. If the eccentric ring 1a is thus fitted to the inside of the eccentric groove 10, the eccentric ring 1a together with the outer ring 5 is fitted into the inner peripheral surface of the housing 3.

With the rolling bearing creep prevention device of the second embodiment according to the invention comprising the components assembled as described above, when the elastic deformation part 2a formed on the eccentric ring 1a is mounted in the housing 3, it is crushed elastically between the inner peripheral surface of the housing 3 and the bottom face 11 of the eccentric groove 10. Resultantly, the outer peripheral surface 17 of the arc abutment part 15 forming the intermediate part of the elastic deformation part 2a abuts elastically the inner peripheral surface of the housing 3. Therefore, if a slight error exists between the diameter dimension of the inner peripheral surface of the housing 3 and that of the bottom face 11 of the eccentric groove 10, the effect of preventing the eccentric ring 1a from slipping with respect to the inner peripheral surface of the housing 3 can be demonstrated.

Moreover, the elastic deformation part 2a made on the eccentric ring 1a forming a part of the rolling bearing creep prevention device of the invention has the arc abutment part 15 in the intermediate part and the outer peripheral surface 17 of the arc abutment part 15 abuts the inner peripheral surface of the housing 3 almost uniformly over the full length thereof. Thus, the contact area between the outer peripheral surface 17 of the arc abutment part 15 forming a part of the elastic deformation part 2a and the inner peripheral surface of the housing 3 can be widened sufficiently as compared with that of the eccentric ring 1 of the first embodiment. Therefore, if a condition is strict such that a dimensional error grows, the sufficient effect of preventing the eccentric ring 1a from slipping with respect to the housing 3 can be provided. Resultantly, rotation of the outer ring 5 in the housing 3 can be prevented more reliably.

Furthermore, since the contact area between the outer peripheral surface 17 of the arc abutment part 15 forming a part of the elastic deformation part 2a and the inner peripheral surface of the housing 3 is made winder than that of the eccentric ring 1 of the first embodiment, a desired slip prevention effect can be obtained without enlarging the outer diameter of the eccentric ring 1 or enlarging the projecting dimension of the tip of each elastic deformation part 2 form the outer peripheral surface of the outer ring in a free state. Therefore, there is no burdensome to push the eccentric ring 1a into the housing, when the eccentric ring 1a fitted to the inside of the eccentric groove 10 is fittingly fixed into the inner peripheral surface of the housing.

Figure 4:
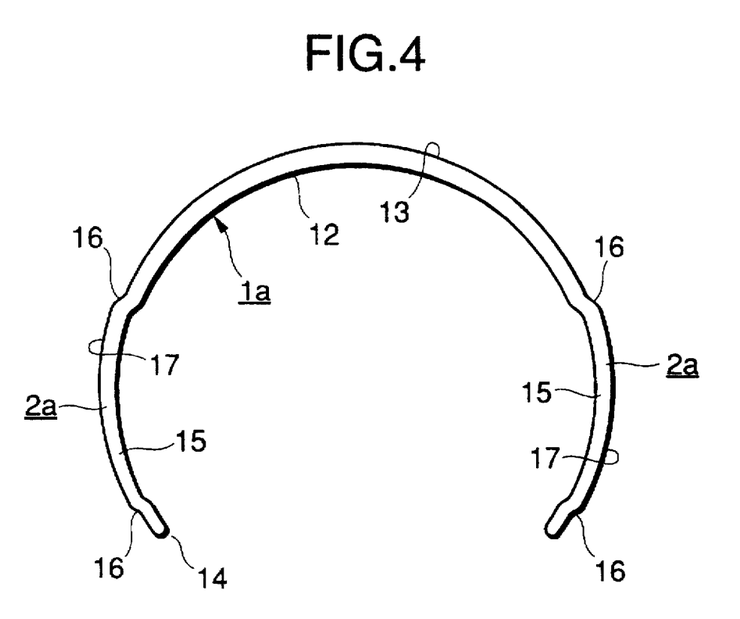
FIG. 4 is an illustration, similar to FIG. 3, to show an eccentric ring according to a third embodiment of the invention.
Figure 5:
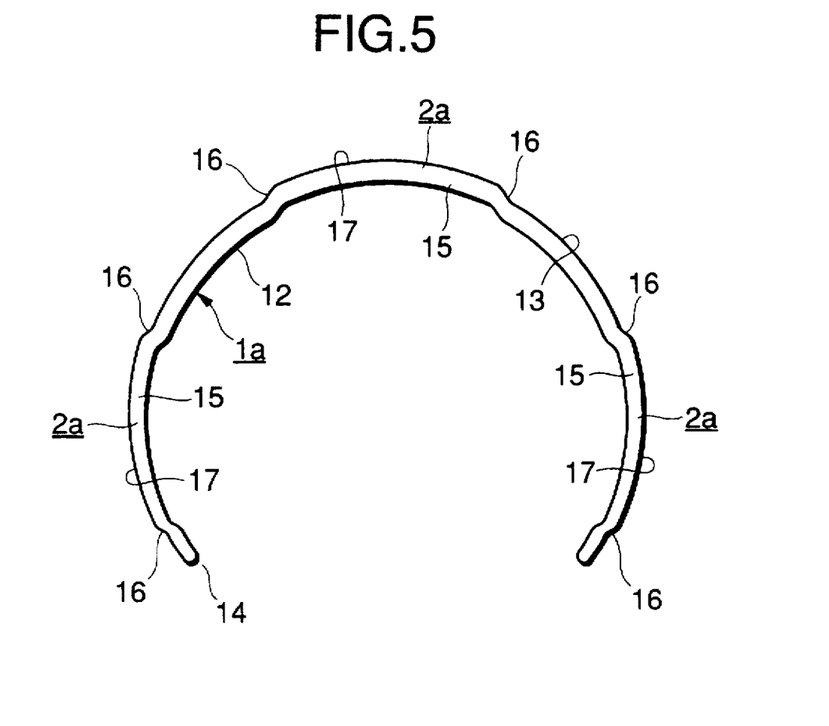
FIG. 5 is an illustration, similar to FIG. 3, to show an eccentric ring according to a fourth embodiment of the invention.
Figure 6:
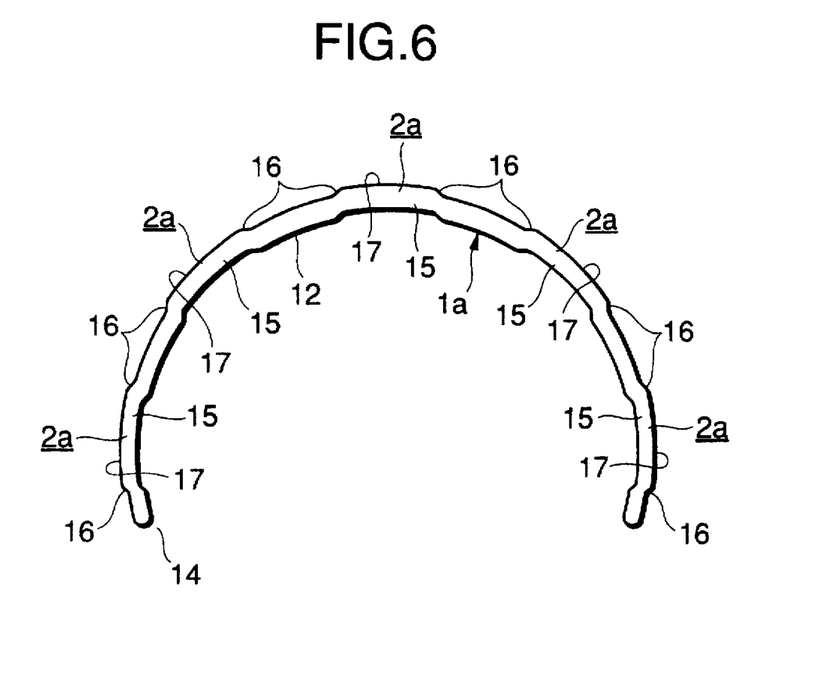
FIG. 6 is an illustration, similar to FIG. 3, to show an eccentric ring according to a fifth embodiment of the invention.
Figure 7A:
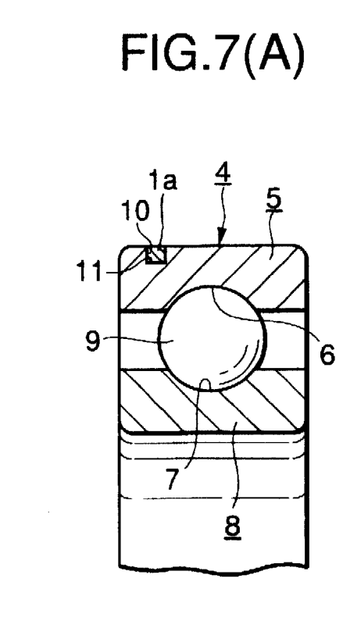
FIGS. 7(A)-7(D) are respectively a fragmentary sectional view to show formation positions of eccentric grooves according to the invention.
Figure 7B:
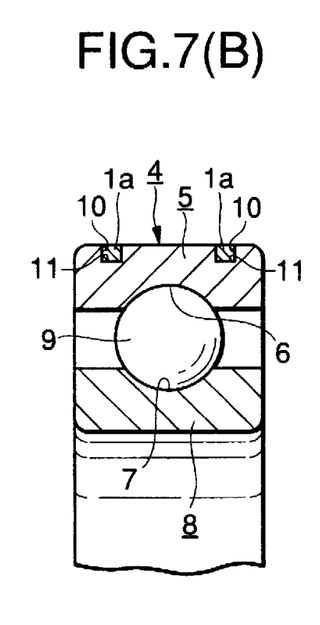
Figure 7C:
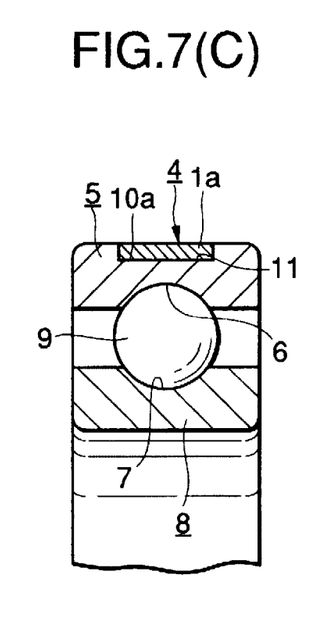
Figure 7D:
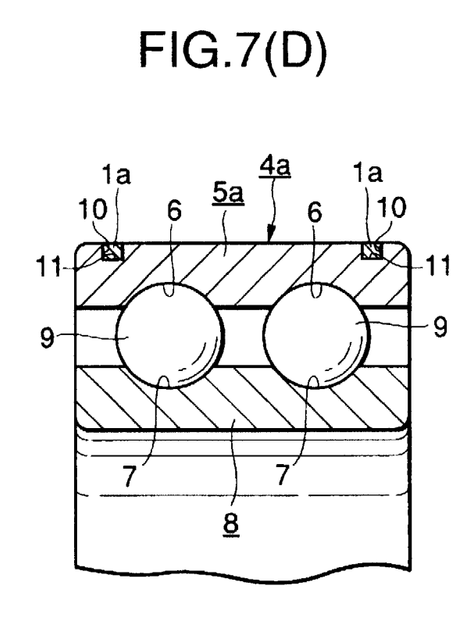

Note that at least one elastic deformation part 2a may be formed, but more than one elastic deformation part 2a can also be formed. To form only one elastic deformation part 2a, it is formed at the center of the eccentric ring 1a, as shown in FIG. 3. To form two elastic deformation parts 2a, they are formed in the proximity of both ends of the eccentric ring 1a becoming almost diametrically opposite to each other in the mounting state on the outer ring 5 (FIG. 1), as in a third embodiment shown in FIG. 4. Further, to form three elastic deformation parts 2a, they are formed at the center of the eccentric ring 1a and in the proximity of both ends thereof, as in a fourth embodiment shown in FIG. 5. To form four or more elastic deformation parts 2a, they are formed at equal intervals in the circumferential direction, as in a fifth embodiment shown in FIG. 6 (in the example shown in the figure, five elastic deformation parts 2a). The rolling bearing creep prevention device in which the eccentric ring 1a shown in FIG. 5 is built can produce the creep prevention effect three to six times or more (varying depending on the temperature condition) that of a structure in which a synthetic resin ring is only located on the outer peripheral surface of the outer ring 5.

Further, the position and the width dimension of the eccentric groove made in the outer peripheral surface of the outer ring can also be changed appropriately in response to the required creep prevention performance and rolling bearing structure. In the first embodiment, one narrow eccentric groove 10 is made to one side of the outer peripheral surface of the outer ring 5, as shown in FIG. 7 (A). In contrast, the creep prevention performance can also be improved by making two narrow eccentric grooves 10 and 10 on both sides of the outer peripheral surface of the outer ring 5, as shown in FIG. 7 (B) or one wide eccentric groove 10a at the center of the outer peripheral surface of the outer ring 5, as shown in FIG. 7 (C). Further, if a rolling bearing 4a is a double-row ball bearing as shown in FIG. 7 (D), two narrow eccentric grooves 10 and 10 are made on both sides of the outer peripheral surface of an outer ring 5a for providing the required creep prevention performance.

Figure 8:
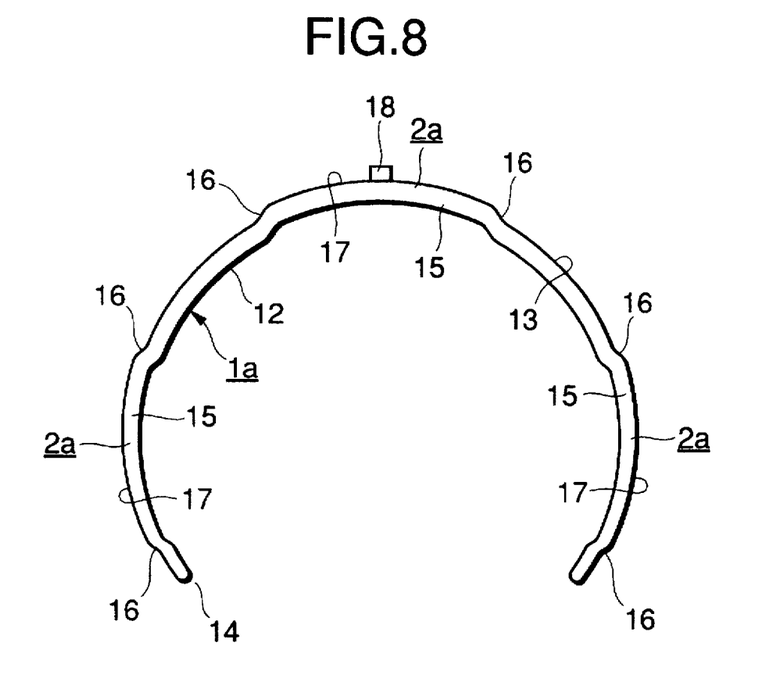
FIG. 8 is an illustration, similar to FIG. 3, to show a sixth embodiment of the invention.

Next, FIG. 8 shows a sixth embodiment of the present invention. In the sixth embodiment, an eccentric ring 1a is formed with one or more elastic deformation parts 2a and 2a (in the example shown in the figure, three) projecting outward in the diametric direction of the eccentric ring 1a. A protrusion 18 projecting outward in the diametric direction is formed in an intermediate part of an arc abutment part 15 forming all or some of the elastic deformation parts 2a (in the example shown in the figure, the center elastic deformation part 2a). For example, a synthetic resin remaining in a gate part for feeding a molten resin into a cavity when injection molding of the eccentric ring 1a with a synthetic resin is executed can be used as the protrusion 18. That is, the synthetic resin existing in the gate part is not cut from the root (the outer peripheral surface part of the arc abutment part 15 and is cut in a slightly diametrically outer part, whereby the protrusion 18 can also be made. If the protrusion 18 is thus formed, it does not increase the manufacturing costs of the eccentric ring 1a.

Figure 1:
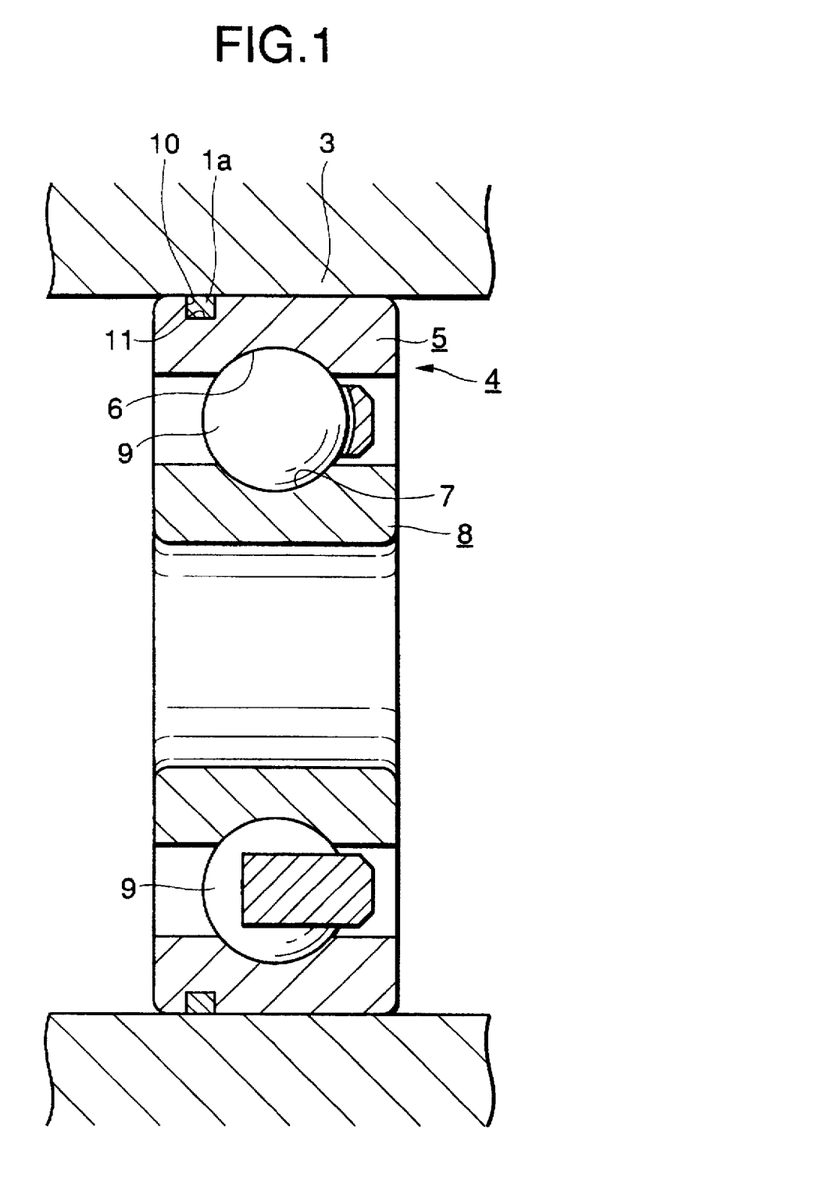
FIG. 1 is a sectional view to show a first embodiment of the invention.

The rolling bearing creep prevention device of the embodiment using the eccentric ring 1a can provide the slip prevention effect of the eccentric ring 1a based on engagement between the protrusion 18 formed in the intermediate part in the circumferential direction of the arc abutment part 15 and the inner peripheral surface of housing 3 (FIG. 1). That is, if an axial groove such as a key groove or a spline groove exists in the inner peripheral surface of the housing 3, the eccentric ring 1a can be reliably prevented from slipping, based on the engagement between the protrusion 18 and the groove. If no groove exists, surface pressure of the abutment part between the tip face part of the protrusion 18 and the inner peripheral surface of the housing 3 rises, thereby raising the frictional force acting on the abutment part for preventing the eccentric ring 1a from slipping. Further, based on the fact that the protrusion 18 is formed in the intermediate part in the circumferential direction of the arc abutment part 15, the necessary slip prevention effect can also be produced even if the dimension and shape accuracy of the eccentric ring 1a is somewhat poor. That is, since the surface pressure of the abutment part between the tip face of the protrusion 18 and the inner peripheral surface of the housing 3 becomes considerably high, if the projection dimension of the protrusion 18 is increased a little, the eccentric ring 1a can be pushed into the housing 3 while the protrusion 18 is being deformed. Therefore, the outer ring on which the eccentric ring 1a is mounted can be mounted in the housing 3 and moreover the dimensional tolerance for preventing the outer ring from rotating can be enlarged.

Figure 9:
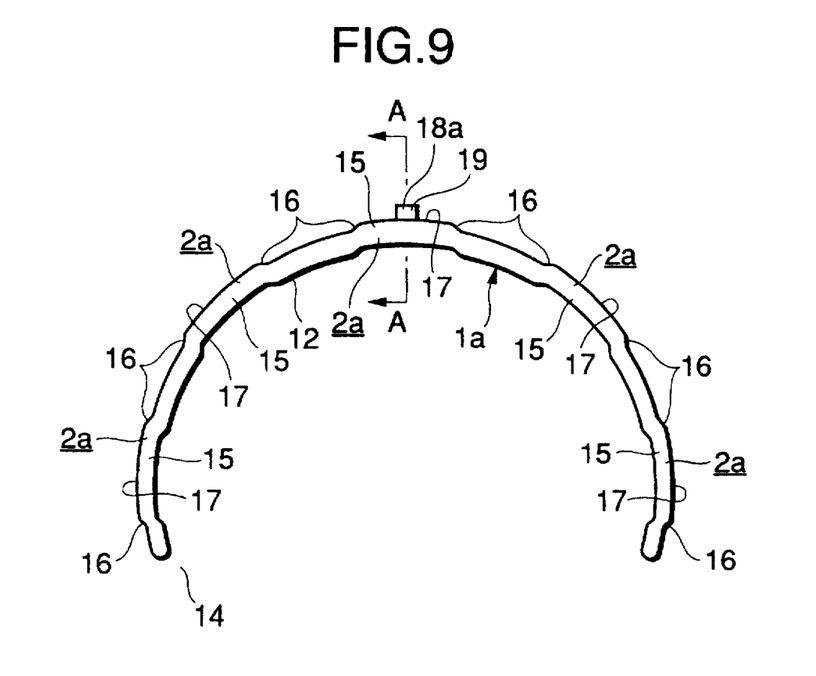
FIG. 9 is an illustration, similar to FIG. 3, to show a seventh embodiment of the invention.
Figure 10:
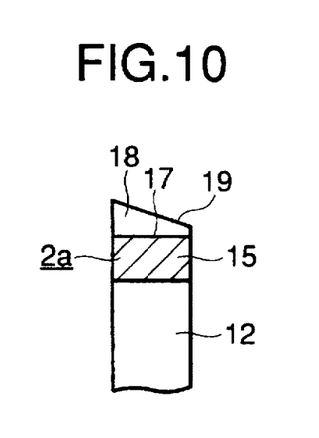
FIG. 10 is a sectional view taken on line A-A in FIG. 9.

Next, FIGS. 9 and 10 show a seventh embodiment of the invention. In the embodiment, the tip face of a protrusion 18a made on an arc abutment part 15 forming all or some of elastic deformation parts 2a (in the example shown in the figure, the center elastic deformation part 2a) is made a slope 19. In the embodiment, an eccentric ring 1a is formed with a number of elastic deformation parts 2a (in the example shown in the figure, five) at equal intervals in the circumferential direction, as in the sixth embodiment shown in FIG. 7. With a rolling bearing 4 to which the eccentric ring 1a of the embodiment thus formed is fitted, the eccentric ring 1a fitted into an eccentric groove 10 (FIGS. 1 and 8) of the rolling bearing 4 can be easily fitted into a housing 3 (FIG. 1). That is, the eccentric ring 1a is inserted into the housing 3 in a state in which the lower side of the slope 19 of the protrusion 18a is directed toward the front in the insertion direction of the rolling bearing 4. The eccentric ring 1a is thus inserted with the direction of the protrusion 18a restricted, whereby the protrusion 18a projecting from the outer peripheral surface of an outer ring 5 forming a part of the rolling bearing 4 becomes elastically deformed while the slope 19 is pressed against an opening marginal part of the housing 3, and the protrusion 18a enters the inside of the housing 3. Thus, the part forming the protrusion 18a can be easily fitted into the housing 3. Other components and function of the seventh embodiment are similar to those of the sixth embodiment.

In the sixth and seventh embodiments, the protrusion 18, 18a is made only on the arc abutment part 15 of the elastic deformation part 2a formed at the center of the eccentric ring 1a. However, the protrusion 18, 18a can also be made on each of the arc abutment parts 15 of the elastic deformation parts 2a formed on the eccentric ring 1a. In such a case, rotation of the outer ring in the housing can be prevented more effectively.

Further, note that a location of the protrusion 18, 18a is not limited to an intermediate part of the arc abutment parts in the circumferential direction, it is possible to dispose the protrusion at another position on the outer peripheral surface of the eccentric ring, unless the protrusion can maintain its function for preventing the outer ring in the housing from rotating.

The rolling bearing creep prevention device of the invention, which has the structure and function as described above, can reliably prevent a creep of the outer ring with respect to the housing and improve reliability and durability of the rotation support part in which a rolling bearing is built.

What is claimed is:

1. A rolling bearing creep prevention device for a rolling bearing (4, 4a) built in a cylindrical inner peripheral surface of a housing (3) and provided with an outer ring (5, 5a) having an outer peripheral surface on which an eccentric groove (10, 10a) is formed in such a manner that said eccentric groove is recessed from the outer peripheral surface and that a center axis of a bottom face of said eccentric groove is made eccentric with respect to a center axis of said outer ring, comprising:

a C-shaped eccentric ring (1, 1a) fitted to an inside of said eccentric groove (10, 10a) and fittingly inserted to the inner peripheral surface of said housing (3), the center axes of an inner peripheral surface and an outer peripheral surface of said eccentric ring being made eccentric with each other, wherein an elastic deformation part (2, 2a) projecting outward in a diameter direction of said eccentric ring is formed in a part of said eccentric ring.

2. A rolling bearing creep prevention device according to claim 1, in which said elastic deformation part (2a) is formed into an arc-shape which is concentric with the outer peripheral surface of said eccentric ring and has a predetermined length in a circumferential direction so as to uniformly abut the inner peripheral surface of said housing over the full length thereof.

3. A rolling bearing creep prevention device according to claim 2, in which a protrusion (18) projecting diametrically outward is formed on said eccentric ring (1, 1a).

4. A rolling bearing creep prevention device according to claim 3, wherein said protrusion (18) is provided with a slope surface inclined in the axial direction of the rolling bearing.

5. A rolling bearing creep prevention device according to claim 2, in which a protrusion (18) projecting diametrically outward is formed in an intermediate part of said elastic deformation part in the circumferential direction.

6. A rolling bearing creep prevention device according to claim 5, wherein said protrusion (18) is provided with a slope surface inclined in the axial direction of the rolling bearing.

7. A rolling bearing creep prevention device according to claim 1, wherein said eccentric ring is made of a synthetic resin having elasticity.

8. A rolling bearing creep prevention device according to claim 1, in which a protrusion (18) projecting diametrically outward is formed on said eccentric ring (1, 1a).

9. A rolling bearing creep prevention device according to claim 8, wherein said protrusion (18) is provided with a slope surface inclined in the axial direction of the rolling bearing.

10. A rolling bearing creep prevention device according to claim 1, in which a protrusion (18) projecting diametrically outward is formed in an intermediate part of said elastic deformation part in the circumferential direction.

11. A rolling bearing creep prevention device according to claim 10, wherein said protrusion (18) is provided with a slope surface inclined in the axial direction of the rolling bearing.

* * * * *